United States Patent [19]
Anderson

[11] 3,735,872
[45] May 29, 1973

[54] FILTER SYSTEM
[76] Inventor: Marvin H. Anderson, 3382 S. Florence Court, Denver, Colo. 80231
[22] Filed: July 12, 1971
[21] Appl. No.: 161,852

Related U.S. Application Data
[62] Division of Ser. No. 826,812, May 22, 1969, abandoned.

[52] U.S. Cl. ..................210/167, 210/193, 210/356
[51] Int. Cl. ....B01d 23/26, B01d 37/02, B01d 35/00
[58] Field of Search........................210/167, 97, 356, 210/345, 489, 331, 151, 346, 413, 193

[56] References Cited
UNITED STATES PATENTS

| | | |
|---|---|---|
| 3,522,886 | 8/1970 | Edmiston ..............................210/345 |
| 3,481,479 | 12/1969 | Hoskins et al. ........................210/489 |
| 2,027,681 | 1/1936 | Durant et al. .........................210/151 |
| 3,297,163 | 1/1967 | Landon ..................................210/331 |
| 3,478,498 | 11/1969 | Sauerman..............................210/489 |

Primary Examiner—Samih N. Zaharna
Assistant Examiner—T. A. Granger
Attorney—Finn G. Olsen and James E. Stephenson

[57] ABSTRACT

A filter system for fluids consisting of a tank in which a plurality of filter units are mounted relative to a recirculation header such that recoating of the filter units with diatomaceous earth is facilitated. The header is operable to provide a high velocity fluid vortex in the tank which is controllable to provide for a coating of each filter unit with size classified particles so that the coating becomes progressively coarser as it continues.

4 Claims, 5 Drawing Figures

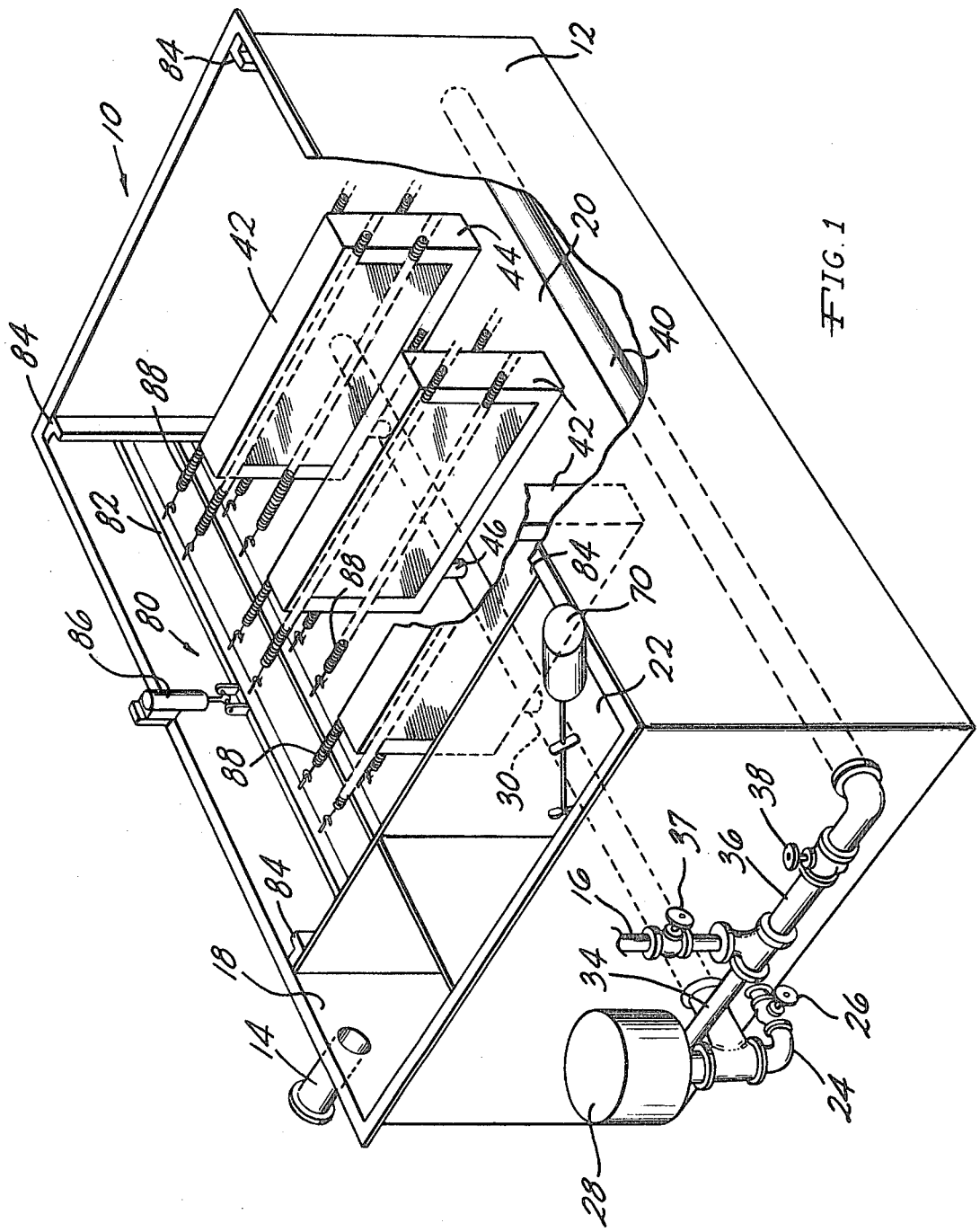

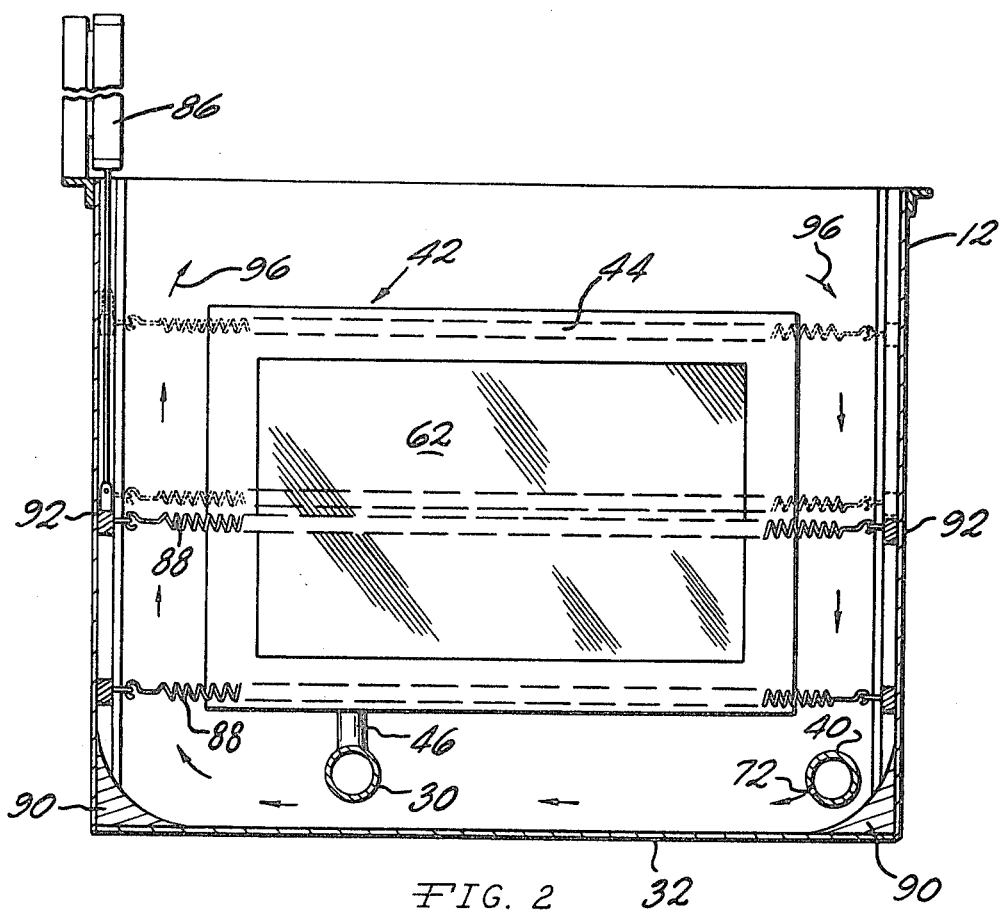
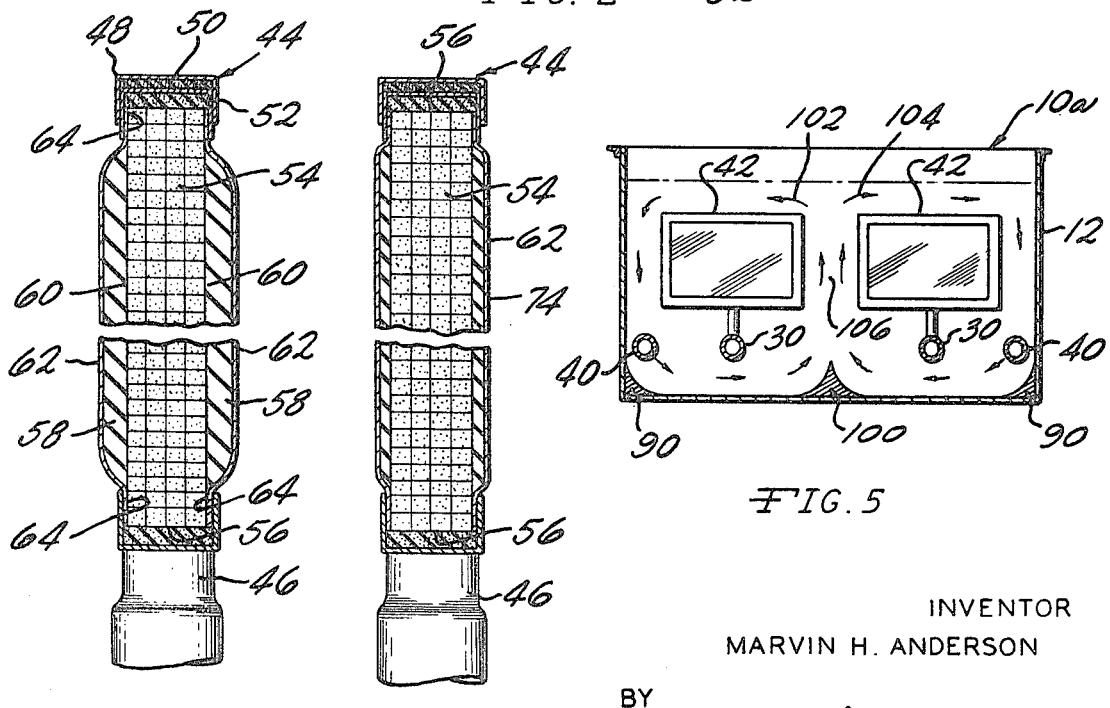
INVENTOR
MARVIN H. ANDERSON

FILTER SYSTEM

This application is a division of copending application Ser. No. 826,812 filed May 22, 1969, now abandoned.

This invention relates generally to filter systems for fluids and more particularly to an improved filter system using diatomaceous earth or the equivalent in which the required periodic cleaning and recoating of the filter units is facilitated.

Fluid filter units utilizing diatomaceous earth, which consists of minute particles each of which is an extremely porous framework of nearly pure silica ranging in dimensions from under 5 to over 100 microns, are in common use. Most of these filter systems include a porous septum which serves as a support for the diatomaceous earth particles. The septum is precoated, namely, provided with a deposit of a thin layer of the diatomaceous earth, prior to commencement of the filter operation. The earth particles bridge the larger openings in the septum and form a microscopically fine sieve, much finer than the septum itself could provide. The precoat thus serves as the actual filter medium and prevents the septum from being fouled by solid impurities in the fluid to be filtered.

The fluid is filtered by passing it through the precoat, which causes impurities in the fluid to become caught in the diatomaceous earth precoat. When enough of these impurities have become caught in the precoat, the pressure drop across the septum reaches a predetermined level indicating that it is necessary to remove the precoat, with the impurities therein, separate the impurities from the diatomaceous earth particles, and reapply the diatomaceous earth to the septum. The principal object of this invention is to provide a system wherein improved recoating of the septum is promoted without the neccessity to add precoat during normal filter runs.

The filter system of this invention consists of a multi-compartment tank having a plurality of filter units disposed in a filter compartment, a stilling compartment wherein impurities float to the top and fluid to be filtered flows into the filter compartment from the bottom of the stilling compartment, and a slurry compartment where diatomaceous earth is added to the system. Each filter unit consists of a supporting frame connected to a suction header, an inner core, compressible foam bodies mounted on the core and septa which are mounted in a fluid tight relation on the frame and which are capable of compressing the foam against the inner core. As the pressure drop across a septum increases, the degree of compression of the foam body is correspondingly increased, and as a result, when the pressure drop is discontinued, the foam body will expand to thereby cause the filter cake on the septum associated therewith to be loosened, thereby facilitating removal of the filter cake. A recirculation header associated with a suction pump connected to the suction header is operable to create a high velocity vortex in the filter compartment. This vortex operates to move the heavier impurities in the removed filter cake to the outside of the tank without disturbing the lighter diatomaceous earth particles so that these particles can be used over and over for recoating the filter units.

Thus, in the system of this invention, the diatomaceous earth particles can be used repeatedly to accomplish efficient filtering at a reduced cost. Vertically movable filter cake removing members are associated with the filter units for assisting in the dislodgment of the filter cake. In a preferred embodiment of the invention, these members consist of coil springs arranged so that each coil in the spring moves at an angle to the filter cake to assist in the efficient removal of the filter cake.

Further objects, features and advantages of this invention will become apparent from a consideration of the following description, the appended claims, and the accompanying drawing in which:

FIG. 1 is a perspective view of the filter system of this invention with some parts broken away for the purpose of clarity;

FIG. 2 is a transverse sectional view of the filter system of this invention;

FIG. 3 is a foreshortened vertical sectional view of a filter unit in the filter system of this invention, showing the components of the unit in the positions which are assumed when there is no pressure drop across opposite walls of the unit;

FIG. 4 is a vertical sectional view of a filter unit, like FIG. 3, showing the components of the unit in the positions assumed when there are significant pressure drops across the unit walls; and FIG. 5 is a diagrammatic view of a modified form of the system of this invention in which dual recirculation headers are used.

With reference to the drawing, the filter system of this invention, indicated generally at 10, is illustrated in FIG. 1 as including a multi-compartment tank 12 having an inlet 14 for fluid, such as water, to be filtered, and an outlet pipe for fluid filtered by the system 10. The tank 12 has a stilling compartment 18 which communicates directly with the inlet 14 so as to receive fluid to be filtered therefrom. At its lower end, the stilling compartment 18 communicates with a filter compartment 20 and a slurry compartment 22 in the tank 12. The slurry compartment 22 is connected by a pipe 24, in which a shut-off valve 26 is interposed, to a pump 28 capable of withdrawing fluid from the slurry compartment 22 through the pipe 24.

A suction header 30 extends longitudinally of the tank 12, adjacent the bottom wall 32 thereof, and is also connected to the inlet for the pump 28. The outlet for the pump 28 is connected to a pipe 34 which is in turn connected to the outlet pipe 16, in which a shut-off valve 37 is interposed, and to a pipe 36 having shut-off valve 38 interposed therein. The pipe 36 is connected to a recirculation header 40 which extends longitudinally of the tank 12 in a substantially parallel spaced relation with the suction header 30. Thus, the pump 28 is capable of drawing fluid through the suction header 30, and discharging this fluid through either the outlet pipe 16 or the recirculation header 40, depending on the positions of the valves 37 and 38. Also, the pump 28 is capable, when the valve 26 is open, of mixing fluid from the slurry tank 22 with the fluid drawn through the suction header 30 and discharged through the pipe 34.

A plurality of filter units 42, illustrated as being three in number, are mounted in a parallel spaced relation in the filter compartment 20 of the tank 12. Each filter unit 42 consists of a rectangular generally upright frame 44 connected at its lower end to a suction pipe 46 mounted on the suction header 30. Each frame 44 includes a generally U-shape outer section 48, a sponge seal 50, and an inner section 52 to assure a fluid tight relationship between the frame 44 and a porous honeycomb inner core 54, at the edges 56 of the core 54. A pair of porous foam bodies 58, which are of generally rectangular slab form, are positioned against opposite sides 60 of the honeycomb inner core 54, as shown in FIGS. 3 and 4. A pair of porous septa 62 are positioned against the foam bodies 58 and at their peripheries 64 the septa are clamped in a fluid tight relation between the honeycomb core 54 and the frame section 52. As a result, fluid drawn from the filter compartment 20 into the suction header 30 must first travel successively through a septum 62, a foam body 58, an inner core 54 and a suction pipe 46.

In the operation of the filter system 10, diatomaceous earth is added to the water in the slurry compartment 22 and a motor driven mixer unit 70 is operated to maintain the earth in suspension in the water in compartment 22. The filter compartment 20 communicates at its lower end with stilling chamber 18, and a conventional water level control assembly (not shown) is operated in conjunction with the water inlet pipe 14 to maintain a level of water in the tank 12 which is above the top ends of the filter units 42. Initially, assume that the filter units 42 are in the condition shown in FIG. 3 and that no diatomaceous earth is present in the filter compartment 20 so that the septa 62 are uncoated. The valve 26 is opened, as is the valve 38, and the valve 37 is closed. As a result, when the pump 28 is operated, fluid containing diatomaceous earth in suspension is pumped from the compartment 22 to the recirculation header 40. As shown in FIG. 2, the header 40 is formed with discharge orifices 72 through which the fluid containing earth is delivered to the filter compartment 20. By operating the pump 28 at low pressure, this fluid carrying the diatomaceous earth becomes uniformly dispersed in the tank 20, and the earth is eventually drawn onto the filter units 42 by the suction in the suction header 30.

When sufficient diatomaceous earth has been supplied to the filter compartment 20, the valve 26 is closed. The fluid in the chamber 20 is continually drawn through the filter units 42 into the suction header 30, thence through the pump 28 and back through the recirculation header 40 into the compartment 20. Diatomaceous earth particles in the water in compartment 20 become progressively pulled against the outer surfaces 74 of the septa 62. When substantially all of the diatomaceous earth in the tank compartment 20 has been applied to the septa 62, the diatomaceous earth becomes the filter medium through which the fluid is subsequently filtered, and the diatomaceous earth forms what is termed a "precoat" on the filter units 42.

The valve 38 is then closed and the valve 37 opened and the pump 28 is operated to draw fluid in the filter compartment 20 through the filter units 42 to the suction header 30 and thence to the output pipe 16, with sufficient fluid being supplied to the stilling chamber 18 to maintain a predetermined water level in the tank 12. Large size impurities which float to the top in the stilling chamber 18 can be periodically removed by either manual or mechanical means.

The foam bodies 58 are very porous so that during the early stages of precoating, any diatomaceous earth particles which pass through the septa 62, prior to bridging of the septum openings, pass freely through the foam bodies 58. However, as the precoat continues to build up on the septa 62, a pressure differential develops between the fluid outside the filter unit 42 and the fluid inside the unit 42, namely, the fluid within the core 54. This pressure differential causes the foam bodies 58 to become compressed to the thickness illustrated in FIG. 4 from the expanded thickness illustrated in FIG. 3. A foam body 58 in its compressed form shown in FIG. 4 is a very rigid and non-resilient.

The foreign particles in the fluid in the compartment 20 are filtered out of the fluid and become entrapped on the precoat, thus causing progressive clogging of the filter unit precoat. This pressure differential is detectable at the pump 28, since the load or vacuum on the pump progressively increases as the clogging becomes increasingly severe. When the vacuum on the pump has increased to a predetermined level, for example, 20 inches of mercury, a sensor (not shown) of conventional construction associated with the pump 28 functions to shut off the pump 28. This immediately results in an equalizing of the pressures on opposite sides of each of the foam bodies 58. As a result, each of the foam bodies 58 expands from its compressed condition shown in FIG. 4 so that it resumes the expanded condition illustrated in FIG. 3. This expansion of the foam bodies 58 effectively loosens the diatomaceous earth and foreign particle mixture which is supported on the septa 62 and is usually referred to as filter cake.

To further assist in the removal of the filter cake, a filter scraping assembly, indicated generally at 80, is mounted in the tank compartment 20. The assembly 80 consists of a frame 82 slidably supported in upright guides 84 mounted on the tank 12 and movable up and down in response to the actuation of suitable motor means such as the cylinder assembly indicated at 86. A plurality of coil springs 88 are mounted on the frame 82 so that they extend across the tank compartment 20 in proximity to the septa 62 in the filter units 42. In the illustrated embodiment of the invention, two springs 88 (FIG. 2) are provided for each septum 62. The springs 88 are spaced apart a distance approximately equal to half the width, measured vertically, of a septum 62 so that in response to up and down movement of the frame 82, the full height of the septum 62 will be subjected to the scraping action of the springs 88. Since the coils in the springs 88 are helical, each coil will move on an angle relative to the surface of a septum 62 so as to effectively scrape the filter cake therefrom. Thus, as a result of the expansion of the foam bodies 58 and the scraping action of the springs 88, the filter cake is removed from the septa 62 and is dispersed in the fluid in the filter compartment 20.

The pump is then started with the valves 26 and 37 closed and the valve 38 open. This causes fluid to be pumped into the compartment 20 through the recirculation header 40, and the pump 28 is operated at sufficient pressure to force the fluid out of the orifices 72 at relatively high velocity. As shown in FIG. 2, the orifices 72 for the recirculation header 40 are directed slightly downwardly and along the tank bottom wall 32 so that the fluid issuing therefrom will move at high velocity along the tank bottom wall 32. Curved baffles 90 positioned on the tank bottom wall 32 at the juncture of the bottom wall 32 with the tank side walls 92 cooperate to cause the fluid in the compartment 20 to roll in a somewhat circular path or vortex indicated by the arrows 96 in FIG. 2 extending about the filter units 42. Thus, the high velocity fluid in the circular vortex breaks up the filter cake which has previously been removed from the filter units 42 resulting in separation of the impurities from the diatomaceous earth in the filter cake. The impurities are generally larger in size and heavier than the very small diatomaceous earth particles. The high velocity fluid vortex created by the jets of fluid issuing through the orifices 72 causes these heavier and larger impurities to be carried to the outer perimeter of the vortex while the lower velocity portion of the vortex disposed radially inwardly of the path indicated by the arrows 96 tends to hold the smaller earth particles. Thus, the vortex does not interfere with the recoating of the earth particles on the septa 62, while promoting movement of the impurities in a path disposed outwardly of the septa 62. After a short time period, for example, about thirty seconds, enough of the finer earth particles have recoated the septa 62 to allow reduction in the flow from the discharge of the pump 28, either by regulating the valve 38 or by reducing the suction pressure on the pump. This reduces the velocity of the fluid vortex in the compartment 20 thereby enabling some of the impurities to be used as precoat on the outer surface of the diatomaceous earth coating on the septa 62. Such a use of the larger impurity particles is desirable because it provides a precoat which becomes progressively finer in nature in a direction extending inwardly toward the core. Also, some of the heavier particles can then settle to the bottom of the compartment 20 where they can be removed.

The filtering cycle above described is then repeated until the pressure drop across the filter units 42 again increases making removal of the filter cake desirable.

A dual recirculation header filter system, indicated generally at 10a, is illustrated in FIG. 5. In the system 10a, filter units 42 are positioned side by side and a pair of recirculation headers 40 are employed in connection with corner baffles 90 and a center baffle 100. As a result, two circular vortexes, indicated by the arrows 102 and 104, are created for the purpose of separating diatomaceous earth and impurities which have been removed from the septa 62. As shown in FIG. 5, in the area 106 between adjacent filter units 42, the velocity vectors from the vortexes 102 and 104 complement each other so that the resultant upward velocity is a summation of these two vectors. This high velocity fluid in the area 106 is advantageous in insuring the desired break up and high velocity roll of the filter cake which is necessary in order to separate the diatomaceous earth particles from the impurities.

From the above description it is seen that this invention provides an improved filter system 10 in which improved filtering is obtained by virtue of the deposit of progressively coarser particles on the filter units 20 during recoating.

What is claimed is:

1. A precoat filter system comprising a tank having a bottom wall and upwardly spaced and opposed side and end walls respectively, for use when filtering fluid having therein fine and relatively coarse particles;

a. an elongated recirculation header in said tank located adjacent the intersection of one of said side walls and said bottom wall and extending along the length of said one side wall, said recirculation header having a plurality of orifices along the length thereof directed to discharge fluid through said orifices, along said bottom wall toward and upwardly along said other side wall and through the body of fluid within the upper portion of said tank and then downwardly along said one side wall in a continuous circular path throughout said tank to thus create a high velocity fluid vortex in said tank having an axis generally parallel to said recirculation header;

b. a plurality of horizontally spaced filter elements provided within said tank and each having filter surfaces vertically disposed thereon with each filter surface subjected to the action of said high velocity fluid vortex, said fluid vortex serving to remove from said filter surfaces the heavier impurities and some of the relatively coarse particles accumulated thereon without removing all of said relatively fine particles from said filter surfaces, whereby said relatively fine particles can be use repeatedly to accomplish efficient filtering;

c. a suction pipe connected to each of said filter elements for drawing the filtered fluid therefrom;

d. pump means connected to said tank, to said recirculation header, and to said suction pipe and provided with valve means for selectively controlling recirculation within said tank of the filtered fluid drawn therefrom by said pump from said tank, or to discharge the filtered fluid drawn from said suction pipe, or to recirculate the filtered fluid drawn from said suction pipe and to force the same through the recirculation header for further filtering.

2. A precoat filter system according to claim 1 wherein the valve means which controls the flow of fluid from said pump to said recirculation header is operable to reduce said flow to thereby reduce the velocity of said high velocity vortex so that the filter surfaces of each filter element can be coated first with some of the finer particles in said fluid and finally with some of the coarser particles in said fluid.

3. A precoat filter system according to claim 1 wherein each of said filter elements comprises a generally rectangular upright inner core constructed of an open material so that fluid can flow both vertically and horizontally therethrough, a rectangular frame enciruling said inner core and disposed in a substantially fluid tight relation along the marginal edges of said inner core, porous compressible foam bodies disposed on vertically opposite sides of and engaged with said inner core, and rectangular porous septa disposed in a covering relation with said porous compressible foam bodies and in fluid tight supported relation on said frame and forming the said filter surfaces of said filter elements.

4. A precoat filter system according to claim 1 further including a second elongated recirculation header in said tank located adjacent the intersection of said other side wall and said bottom wall and extending substantially parallel to and spaced from said first recirculation header, said second recirculation header having a plurality of discharge orifices along the length thereof directed generally toward said first recirculation header, baffle means within said tank and positioned on and extending upwardly from the bottom wall thereof between said headers and in generally parallel relation thereto for directing fluid from said orifices in said first and second recirculation headers upwardly so as to form two side-by-side generally continuous circular fluid paths each creating a high velocity fluid vortex in said tanks, each of said circular paths having a plurality of spaced filter elements disposed therein.

* * * * *